(12) United States Patent  
Palmer

(10) Patent No.: US 7,464,895 B2  
(45) Date of Patent: Dec. 16, 2008

(54) LIGHTER-THAN-AIR AIRCRAFT AND RELATED METHODS FOR POWERING THE SAME

(75) Inventor: William Robert Palmer, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 140 days.

(21) Appl. No.: 10/977,418

(22) Filed: Oct. 29, 2004

(65) Prior Publication Data

US 2006/0091256 A1    May 4, 2006

(51) Int. Cl.  
B64B 1/08        (2006.01)

(52) U.S. Cl. .......................................... 244/30

(58) Field of Classification Search .................. 244/30, 244/31, 24, 96, 97, 61, 125, 126, 128  
See application file for complete search history.

(56) References Cited

U.S. PATENT DOCUMENTS

| | | | |
|---|---|---|---|
| 2,078,532 A | 4/1937 | Fischer | 244/61 |
| 4,269,375 A * | 5/1981 | Hickey | 244/26 |
| 4,697,761 A | 10/1987 | Long | 244/62 |
| 4,995,572 A | 2/1991 | Piasecki | 244/2 |
| 5,005,783 A | 4/1991 | Taylor | 244/97 |
| 5,147,429 A * | 9/1992 | Bartholomew et al. | 55/356 |
| 5,348,254 A * | 9/1994 | Nakada | 244/97 |
| 5,645,248 A | 7/1997 | Campbell | 244/30 |
| 5,810,284 A | 9/1998 | Hibbs et al. | 244/13 |
| 5,890,676 A * | 4/1999 | Coleman et al. | 244/128 |
| 6,010,093 A | 1/2000 | Paulson | 244/24 |
| 6,119,979 A | 9/2000 | Lee et al. | 244/97 |
| 6,131,851 A | 10/2000 | Williams | 244/58 |
| 6,224,015 B1 * | 5/2001 | Reinhard | 244/24 |
| 6,224,016 B1 * | 5/2001 | Lee et al. | 244/30 |
| 6,311,931 B1 * | 11/2001 | Smay | 244/164 |
| 6,371,409 B1 | 4/2002 | Steele | 244/30 |
| 6,386,480 B1 * | 5/2002 | Perry et al. | 244/24 |
| 6,550,717 B1 | 4/2003 | MacCready et al. | 244/13 |
| 6,609,680 B2 | 8/2003 | Perry et al. | 244/30 |
| 6,908,702 B2 * | 6/2005 | McElroy et al. | 429/26 |
| 2002/0005457 A1 | 1/2002 | Lee et al. | 244/30 |

OTHER PUBLICATIONS

Stibbe, Popular Science, Meet the Homeland Security Blimp, Feb. 2004, available at www.popsci.com.  
Groepper, High Altitude Long Endurance Stratospheric Airships, Technology Harmonisation and Strategy Division, ESTEC, Preparing for the Future, vol. 10, No. 1, Mar. 2000.  
Description of High Altitude Airship, available at www.skyflight.co.uk.

* cited by examiner

Primary Examiner—Tien Dinh  
(74) Attorney, Agent, or Firm—Allen Dyer Doppelt Milbrath & Gilchrist

(57) ABSTRACT

A lighter-than-air aircraft includes a gas envelope for containing a buoyant gas, and a solar panel is carried by a predetermined portion of the gas envelope. A solar sensor is used for determining a direction of the sun. A propulsion system carried by the gas envelope orients the gas envelope so that the solar panel is oriented in the direction of the sun based upon the solar sensor. A navigation controller cooperates with the propulsion system to move the lighter-than-air aircraft along a desired flight path while the solar panel is oriented in the direction of the sun.

17 Claims, 10 Drawing Sheets

LIGHTER-THAN-AIR AIRCRAFT AND RELATED METHODS FOR POWERING THE SAME

FIELD OF THE INVENTION

The present invention relates to the field of lighter-than-air aircraft, and in particular, to a lighter-than-air aircraft capable of remaining in the air at high altitudes for extended periods of time.

BACKGROUND OF THE INVENTION

High altitude, long-duration solar powered aircraft have been proposed for both commercial and military applications. For example, lighter-than-air aircraft have been proposed for cellular telephone applications. Military applications also include telecommunication applications as well as providing surveillance.

There is a domain in the upper stratosphere at 60,000 feet where it is ideal to position a lighter-than-air aircraft. This altitude allows on-board sensors to see over the horizon at least 350 miles in any direction. In most such applications, long duration station keeping is essential. Consequently, the issue is not in getting an aircraft to 60,000 feet, but in maintaining power so that the on-board sensors and electronics are continuously powered for extended periods of time, which may be from a few weeks to several months to even longer.

Electrical energy generated using solar cells or photovoltaic cells are typically used to power lighter-than-air aircraft. For example, U.S. Patent Application No. 2002/0005457 discloses a lighter-than-air aircraft powered with flexible solar cells integrated within the material covering the aircraft. Although the energy provided by solar cells is adequate to power lighter-than-air aircraft while in the sunlight, the challenge is to repeatedly get through the night. To keep a large lighter-than-air aircraft in a general location at 60,000 feet requires a significant amount of power. The solar panels not only need to take in enough solar energy to power the aircraft during the day, but also needs to take in additional power to be stored in batteries so that it can be used during the night.

In addition, extra power is needed to maintain position due to the upper winds or air currents at 60,000 feet, and for maintaining direction of the solar panels toward the sun as the direction of the sun changes throughout the day. This puts a bigger demand on the ability to store power for use during the night. One approach is to place more solar panels on the aircraft for collecting and storing the additional power, but this results in an increase of the weight of the aircraft. The greater the weight, the greater the volume of lift gas required, which increases the amount of material necessary to contain the lift gas. These increases in weight and volume impose additional power requirements.

As an alternative to placing more solar panels on the aircraft, one approach is to maintain an optimum position of the solar cells in relationship to the sun. For example, most all spacecraft are solar powered. In such spacecraft, the solar panels are rotatable so that an optimum angle can be maintained between the solar panels and the sun. However, these systems are not particularly advantageous on a lighter-than-air aircraft. In U.S. Pat. No. 6,371,409, solar panels mounted on an outer surface of a lighter-than-air aircraft are movable over a portion of the surface thereof to adjust for changes in the direction of the sun, or if maintained in a stationary position, for the inclination of the sun throughout the day.

Another approach to providing the power needed throughout the night is to use fuel cells. For example, the power requirements for the high altitude airship (HAA) as designed by Lockheed Martin Corp. are met by a combination of solar cells, fuel cells and batteries, wherein the fuel cells provide electrical power during the night. The fuel cells receive the gaseous elements of hydrogen and oxygen for generating electrical power.

SUMMARY OF THE INVENTION

In view of the foregoing background, it is therefore an object of the present invention to increase the efficiency at which energy is collected, stored and converted to power so that a lighter-than-air aircraft can remain aloft at high altitudes for extended periods of time without having to return to ground for refueling.

This and other objects, features, and advantages in accordance with the present invention are provided by a lighter-than-air aircraft comprising a gas envelope for containing a buoyant gas, at least one solar panel carried by a predetermined portion of the gas envelope, and at least one solar sensor for determining a direction of the sun.

A propulsion system carried by the gas envelope orients the gas envelope so that the solar panel is oriented in the direction of the sun based upon the solar sensor. The lighter-than-air aircraft may further comprise a navigation controller cooperating with the propulsion system to move the lighter-than-air aircraft along a desired flight path while the solar panel is oriented in the direction of the sun. Pointing the solar panel in the direction of the sun independent of the desired flight path increases the efficiency at which solar energy is collected.

The lighter-than-air aircraft is capable of high-altitude station keeping within altitude and perimeter boundaries for extended periods of time. The lighter-than-air aircraft is intended to operate at an altitude of about 60,000 to 80,000 feet in the stratosphere, where it is ideal to sit, look, listen and provide surveillance and communications from a strategic perspective. This altitude allows on-board sensors to see over the horizon at least 350 miles in any direction.

Since the propulsion system orients the gas envelope so that the solar panel is oriented in the direction of the sun based upon the solar sensor, this allows the solar panel to be constantly pointing toward the sun. With the performance of the solar panel being optimized, extra solar panels do not need to be carried by the gas envelope. This advantageously reduces the overall weight and cost of the lighter-than-air aircraft.

The gas envelope may be substantially symmetrical about a vertical axis and may comprise an upper portion having a partial spheroidal shape. The solar panel may be carried by a predetermined segment of the partial spheroid. As a result of the symmetry of the gas envelope, the solar panel may be placed on any side thereof and still be optimized for collecting solar energy when facing the direction of the sun. In contrast, the direct front or rear of a traditional blimp has little or no solar exposure since the blimp does not have symmetry about its vertical axis.

The propulsion system may comprise an electrical propulsion system. The lighter-than-air aircraft may further comprise a closed loop fuel cell carried by the gas envelope for powering the electrical propulsion system when the solar panel is not generating sufficient electricity, and having its fuel regenerated by the solar panel from its exhaust when the solar panel is generating sufficient electricity. The closed loop fuel cell advantageously increases the efficiency at which fuel is stored and converted to power so that the lighter-than-air aircraft can remain aloft at high altitudes for extended periods of time without having to return to ground for refueling.

The lighter-than-air aircraft may further comprise a support structure within the gas envelope. The support structure moves the gas envelope from a retracted position to an expanded position as the buoyant gas expands due to an increase in altitude of the lighter-than-air aircraft. A gondola may also be carried by the gas envelope, and as the gas envelope moves from the retracted position to the expanded position, the gondola may be lowered from the gas envelope as the later expands.

In the retracted position, the gas envelope and gondola have less drag because of its "flat top," and because the gondola is pulled closer to the gas envelope. This results in the gas envelope and gondola having a reduced cross section, which helps to reduce the effects of winds at the lower altitudes. Another advantage of the "flat top" design is that it allows for a significant reduction in the height of the facility constructing the lighter-than-air aircraft. Once the lighter-than-aircraft reaches its desired altitude near or above 60,000 feet, the gas envelope is fully expanded.

The propulsion system may comprise a plurality of spaced apart propellers extending outwardly from the gondola. A respective electric motor may drive each of the propellers. The propulsion system may further comprise a respective gimbal coupled to each of the propellers.

Another aspect of the present invention is directed to a method for operating a lighter-than-air aircraft comprising a gas envelope for containing a buoyant gas, at least one solar panel carried by a predetermined portion of the gas envelope, at least one solar sensor, and a propulsion system carried by the gas envelope. The method comprises determining a direction of the sun based upon the at least one solar sensor, and using the propulsion system for orienting the gas envelope so that the at least one solar panel is oriented in the direction of the sun.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime, and double prime notations are used to indicate similar elements in alternative embodiments.

Figure 1:
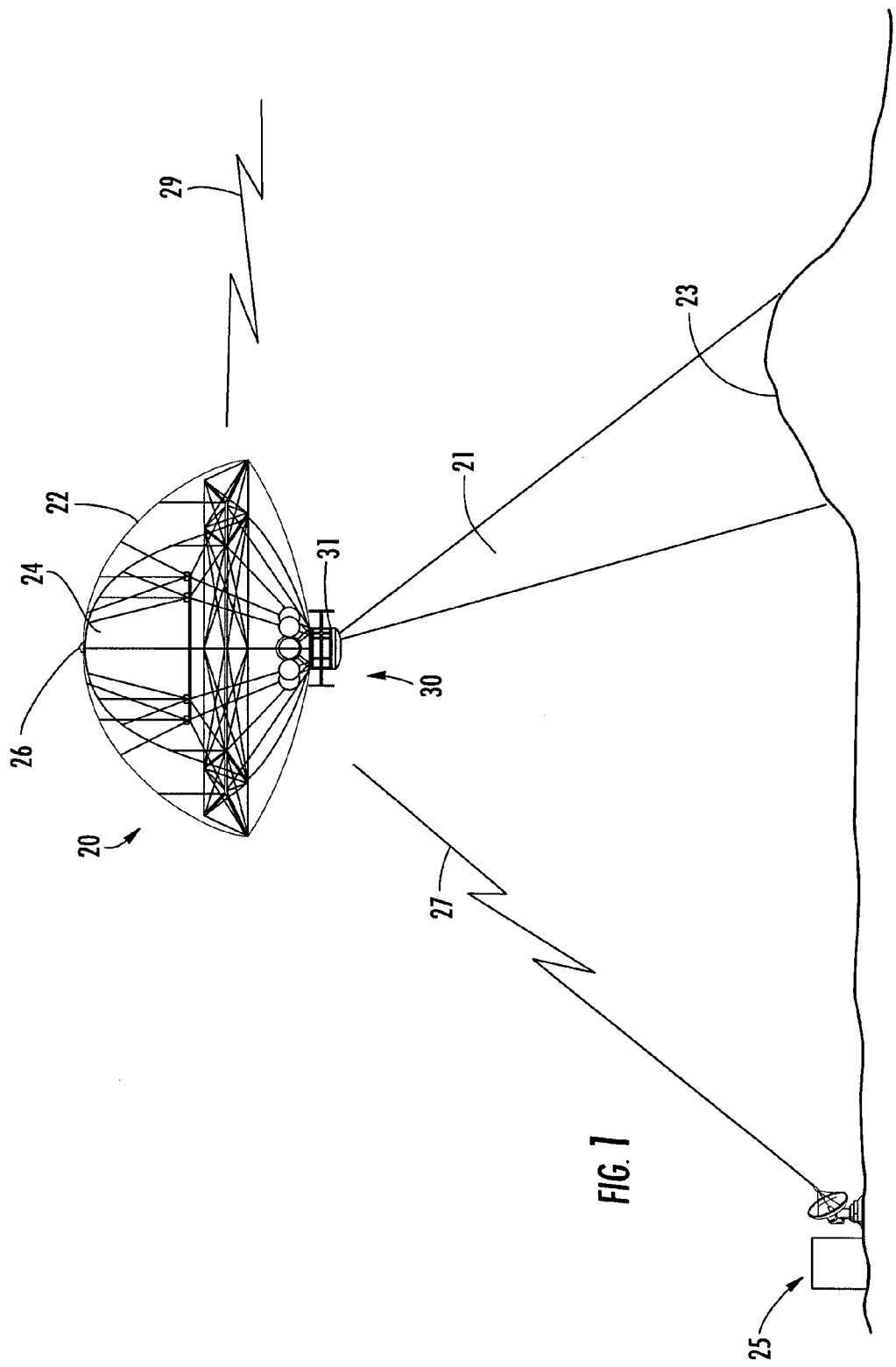
FIG. 1 is a perspective view of a lighter-than-air aircraft at high altitude providing surveillance and communications about a desired location on earth in accordance with the present invention.
Figure 2:
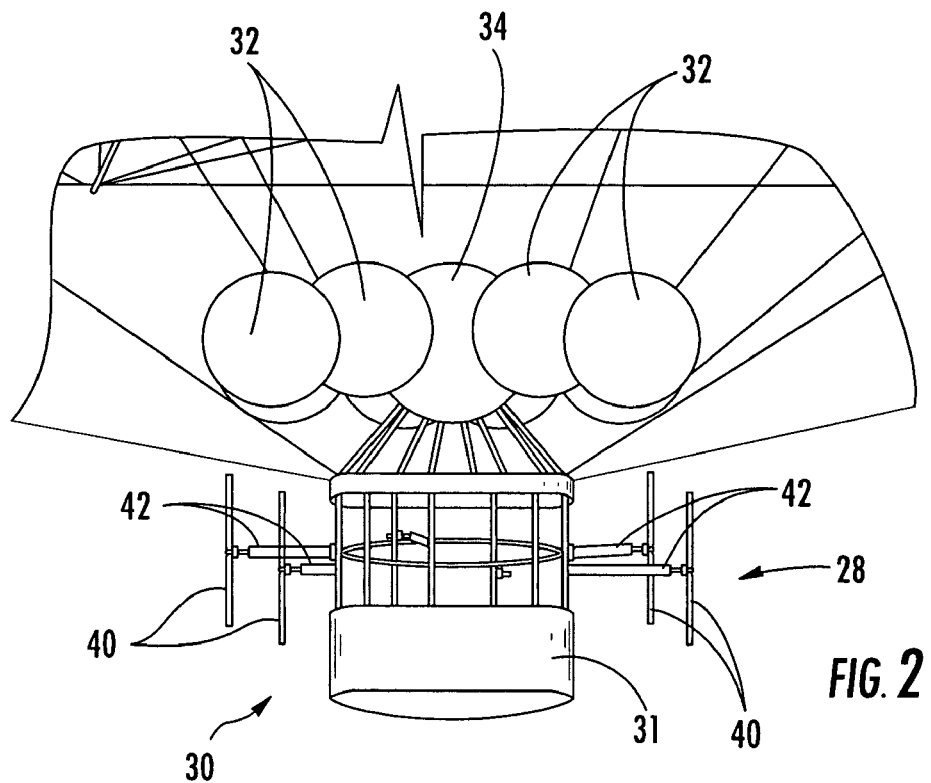
FIG. 2 is an enlarged perspective view of the underside of the lighter-than-air aircraft as shown in FIG. 1 illustrating in greater detail the gondola and fuel storage holders.
Figure 3:
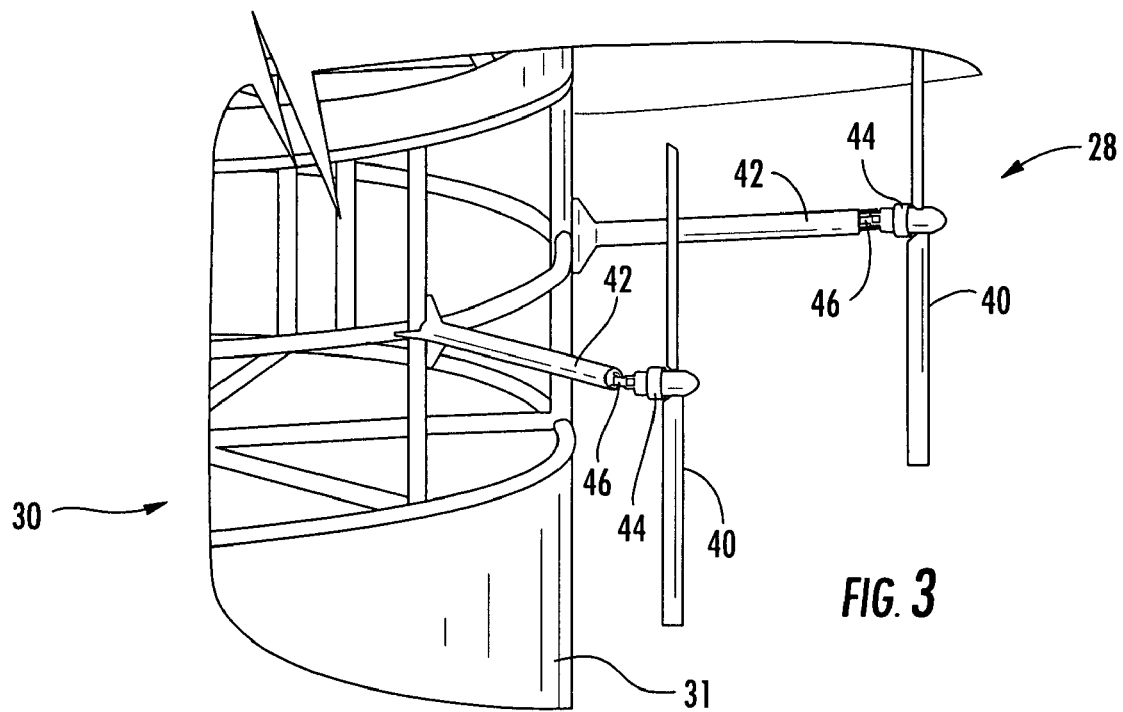
FIG. 3 is an enlarged view of the gondola as shown in FIG. 2 illustrating in greater detail the propulsion system for the lighter-than-air aircraft.

Referring initially to FIGS. 1-3, the lighter-than-air aircraft 20 is capable of high-altitude station keeping within altitude and perimeter boundaries for extended periods of time. The illustrated lighter-than-air aircraft 20 is in the upper stratosphere at 60,000 to 80,000 feet, for example, where it is ideal to sit, look, listen and provide surveillance and communications from a strategic perspective. This altitude allows on-board sensors to see at least 350 miles in any direction. For example, the lighter-than-air aircraft 20 may provide surveillance 21 about a location of interest 23 on the surface of the earth, and provide this information to a command and control center 25 via a communications link 27, as illustrated in FIG. 1. The lighter-than-air aircraft 20 may also provide over the horizon surveillance or communications 29.

The lighter-than-air aircraft 20 is unmanned, and communications 27 is provided with the ground based command and control center 25. Communications 27 may be directly between the command and control center 25 and the lighter-than-air aircraft 20. Alternatively, communications 27, 29 may be provided via a relay satellite or other airborne platform.

The lighter-than-air aircraft 20 comprises a gas envelope 22 containing a buoyant gas, and at least one solar panel 24 is carried by a predetermined portion of the gas envelope. The at least one solar panel may be one large solar panel, or may be a solar array comprising a plurality of smaller solar panels. For purposes of discussion, the at least one solar panel 24 will simply be referred to as the solar panel. The solar panel 24 may be integrated into the skin of the gas envelope 22, or may be separate from the skin, as readily appreciated by those skilled in the art. The buoyant gas, for example, may be helium, hydrogen or combinations thereof, or other combinations of lighter-than-air gasses.

At least one solar sensor 26 determines a direction of the sun based upon the incident light rays received from the sun. The solar sensor 26 may be separate from the solar panel 24, as illustrated. Alternatively, the solar sensor 26 may be integrated within the solar panel 24 for determining the direction of the sun based upon the incident light rays. The illustrated solar sensor 26 is located on top of the gas envelope 22. In another embodiment, a plurality of solar sensors 24 are spaced around the gas envelope 22.

A propulsion system 28 orients the gas envelope 22 so that the solar panel 24 is oriented in the direction of the sun based upon the solar sensor 26. This advantageously allows the solar panel 24 to be constantly pointing toward the sun. Since the performance of the solar panel 24 is optimized, extra solar panels do not need to be carried by the gas envelope 22, which reduces the overall weight, complexity and cost of the lighter-than-air aircraft 20.

A gondola 30 is carried by the gas envelope 22. As will be discussed in greater detail below, power conversion, management functions and the propulsion system 28 are an integral part of the gondola 30. Many of these items are carried by the payload bay 31 of the gondola 30. In particular, the payload bay 31 carries the electronics, communications and/or surveillance equipment. Fuel storage is above the gondola 30 and is enclosed by the gas envelope 22. The fuel storage includes hydrogen and oxygen fuel holders 32, 34 for respectively storing the gaseous elements of hydrogen and oxygen to be used for powering the propulsion system 28. The water that is broken down into hydrogen and oxygen gases is carried in the gondola 30.

The propulsion system 28 comprises a plurality of spaced apart propellers 40 extending from the gondola 30. Each propeller 40 can be independently driven, or the propellers can all be driven together. In the illustrated embodiment of the propulsion system 28, six booms 42 are attached to the gondola 30 for supporting six independent drives 44, i.e., six electric motors. Each boom 42 thus supports a respective electric motor 44 for driving the propeller 40 coupled thereto. The actual number of motors/propellers can vary depending on their size and the size of the lighter-than-air aircraft 20.

Each electric motor 44 is also coupled to a dual axis gimbal 46. The dual axis gimbals 46 advantageously allow the propellers 40 to be positioned so that the lighter-than-air aircraft 20 can move in any direction, similar to a helicopter. An advantage of the propulsion system 28 is that the lighter-than-air aircraft 20 can move in any direction while the solar panel 24 is continuously being pointed in the direction of the sun. In other words, the navigation vector of the lighter-than-air aircraft 20 can vary while the sun vector associated with the angle of the solar panel 24 pointed in the direction of the sun remains constant toward the sun.

Figure 4A:
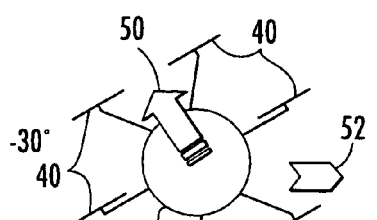
FIGS. 4a-4e illustrate various positions of the propulsion system resulting in a navigation vector that varies while the solar panel is continuously pointed in the direction of the sun for the lighter-than-air aircraft in accordance with the present invention.

An example of the solar panel 24 being continuously pointed toward the sun while the navigation vector changes is illustrated in FIGS. 4a-4e. The navigation vector 50 represents the direction and motion of the lighter-than-air aircraft 20. Even if the lighter-than-air aircraft 20 is not moving, the navigation vector 50 may vary to compensate for wind direction and speed. In FIG. 4a, the propellers 40 are rotated so that the navigation vector 50 is at −30 degrees while the sun vector 52 is at 90 degrees. The sun vector 52 represents the direction the solar panel 24 is pointing.

Figure 4B:
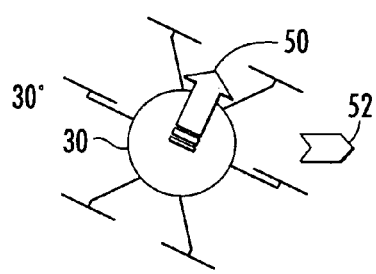
Figure 4C:
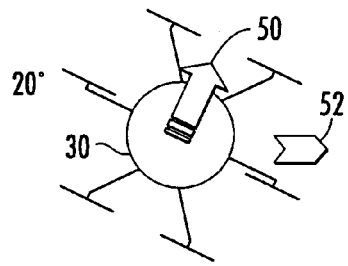
Figure 4D:
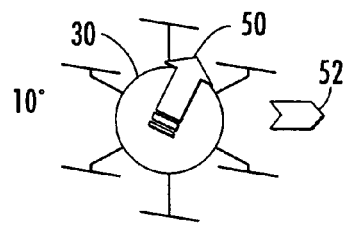
Figure 4E:
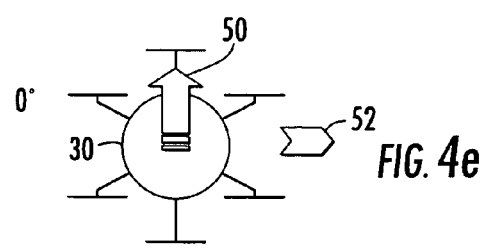

If the navigation vector 50 changes to 30 degree, the propellers 40 carried by the gondola 30 are rotated accordingly while the sun vector 52 remains constant at 90 degrees, as illustrated in FIG. 4b. The same concept applies when the navigation vector 50 changes to 20, 10 and 0 degrees, as illustrated in FIGS. 4c, 4d and 4e.

An example of the navigation vector 50 being constant while the sun vector 52 changes is illustrated in FIGS. 5a-5f. With the lighter-than-air aircraft 20 holding a fixed position, the gas envelop 22 needs to rotate as the sun rises and sets during the day so that the solar panel 24 remains constantly pointed toward the direction of the sun.

Figure 5A:
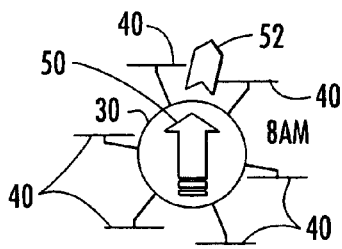
FIGS. 5a-5f illustrate various positions of the propulsion system resulting in a navigation vector that remains constant while the position of the solar panel varies for tracking the sun during the day for the lighter-than-air aircraft in accordance with the present invention.
Figure 5B:
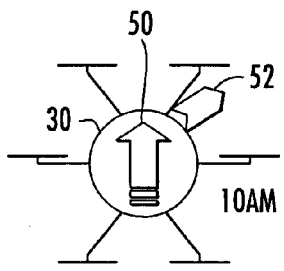
Figure 5C:
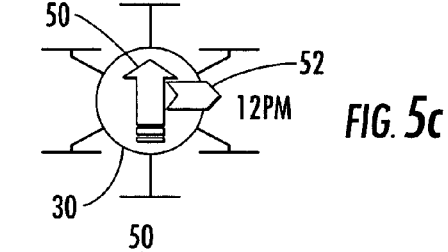
Figure 5D:
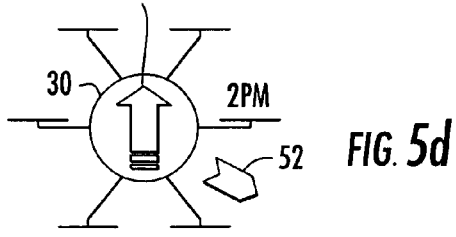
Figure 5E:
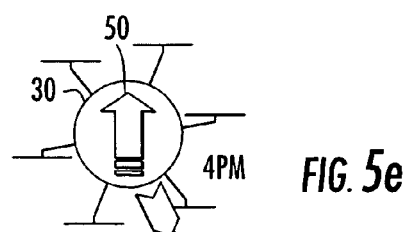
Figure 5F:
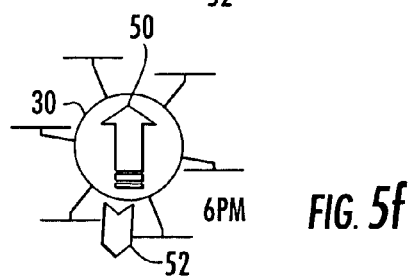

At 8 am, for example, the sun vector 52 is at 10 degrees, as illustrated in FIG. 5a. At 10 am, the sun vector 52 is at 45 degrees, but this requires the propellers 40 that are carried by the gondola 30 to be rotated so that the solar panel 24 follows the direction of the sun while the navigation vector 50 remains constant, as illustrated in FIG. 5b. The process is repeated throughout the day as the sun changes position, as illustrated in FIGS. 5c-5f.

In the illustrated lighter-than-air aircraft 20, the gas envelope 22 and the gondola 30 are fixed. That is, when the gas envelope 22 rotates, so does the gondola 30. This embodiment requires the motors 44 to operate in a sequence with a stepwise re-clocking of the propellers 40 when they have been rotated as far as they can rotate for maintaining a constant pointing of the solar panel 24 toward the direction of the sun. For example, when a first motor in the sequence of motors reaches its maximum allowable gimbal rotation, it simply slows and rotates approximately 180 degrees and becomes the last motor in the sequence of motors. The sequence of the motors continues to change as necessary based upon the desired navigation and/or solar vector. Also, the thrust direction of each re-clocked propeller 40 is reversed.

In another embodiment, the gas envelope 22 and the gondola 30 rotate independently from one another, much like a turret on a tank. The gondola 30 may rotate as necessary to maintain a desired flight path vector while the solar panel 24 remains in the direction of the sun.

Figure 6:
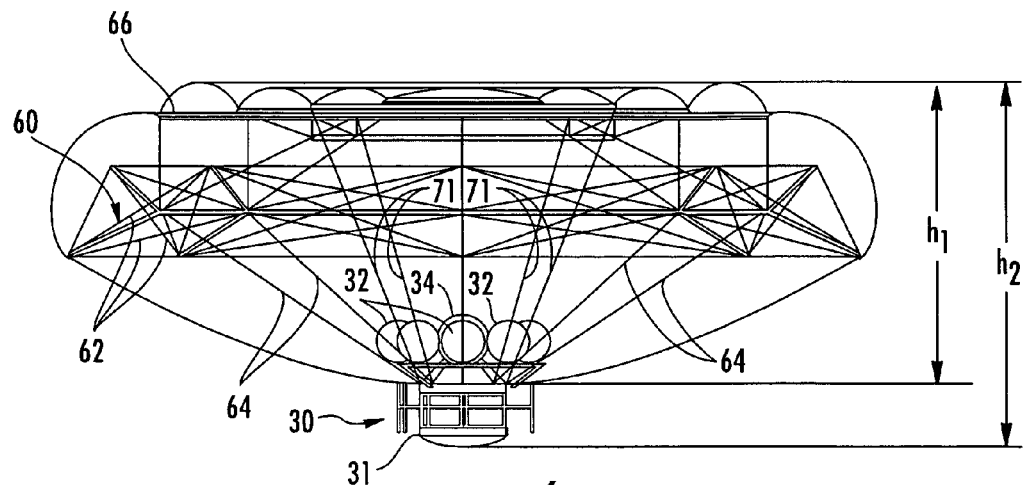
FIG. 6 is a cross-sectional side view of the lighter-than-air aircraft illustrating the support structure within the gas envelope wherein the upper portion of the gas envelope is in a retracted position in accordance with the present invention.
Figure 7:
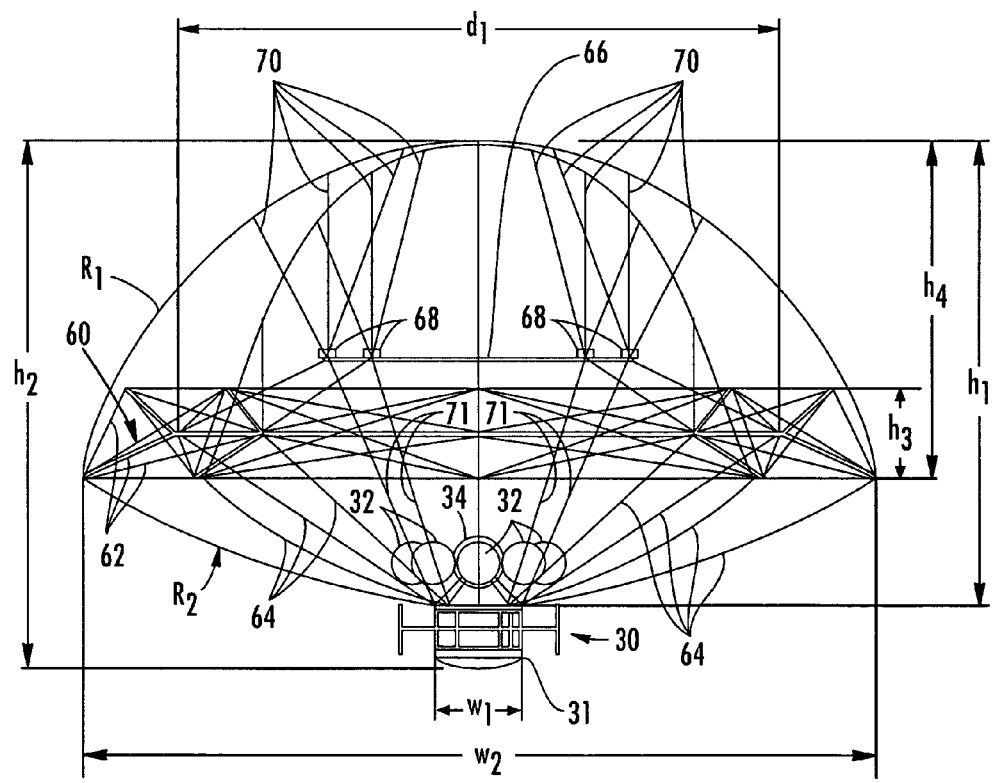
FIG. 7 is a cross-sectional side view of the lighter-than-air aircraft illustrating the support structure within the gas envelope wherein the upper portion of the gas envelope is in an expanded position in accordance with the present invention.

Referring now to FIGS. 6 and 7, the gas envelope 22 comprises a support structure for moving THE gas envelope from a retracted position (FIG. 6) to an expanded position (FIG. 7). The support structure comprises a hoop-truss member 60 having a ring shape. The hoop-truss member 60 is derived from hoop antennas that are deployed in space, as readily appreciated by those skilled in the art. The hoop-truss member 60 includes a number of compressive members and stabilizing tension cords 62 for providing the necessary support. Other internal design structures are acceptable as readily appreciate by those skilled in the art, such as a radial rib structure, for example.

The gondola 30 is attached to the hoop-truss member 60 via attachments 64, and to a control member 66 via attachments 71. The control member 66 is above the hoop-truss member 60. Fuel storage holders for the applicable gases are above the gondola 30, and are enclosed by the gas envelope 22. The fuel storage holders as noted above include hydrogen and oxygen fuel holders 32, 34 for respectively storing the gaseous elements of hydrogen and oxygen to be used for powering the propulsion system 28 during the night.

The control member 66 enables volumetric control of the upper portion of the gas envelope 22 during ascent and decent. As the buoyant gas expands or contracts as a function of the altitude, the volume of the gas envelope 22 changes accordingly. Although not shown in the figures, a perimeter stabilized inflatable structure, in concert with the more stable rigid members 60 and 66, may also be used to provide support of the desired contour of the gas envelope 22. An approach of using radial members within the cord structure allows the creation of a substantially circular shape.

Volumetric control of the gas envelope 22 may be performed manually or automatically. Small electric motors 68 are positioned around the control member 66, and retract or release tie-downs 70 attached to the upper surface of the gas envelope 22, and tie-downs 71 attached to the gondola 30. The electric motors 68 are not limited to being located around the control member 66. They may be located around the hoop-truss member 60, for example. The gondola 30 carries an altimeter 72 for determining the altitude of the lighter-than-air aircraft 20, and provides the altitude to an envelope controller 74 or measurement of barometric pressure/relative pressure.

Figure 13:
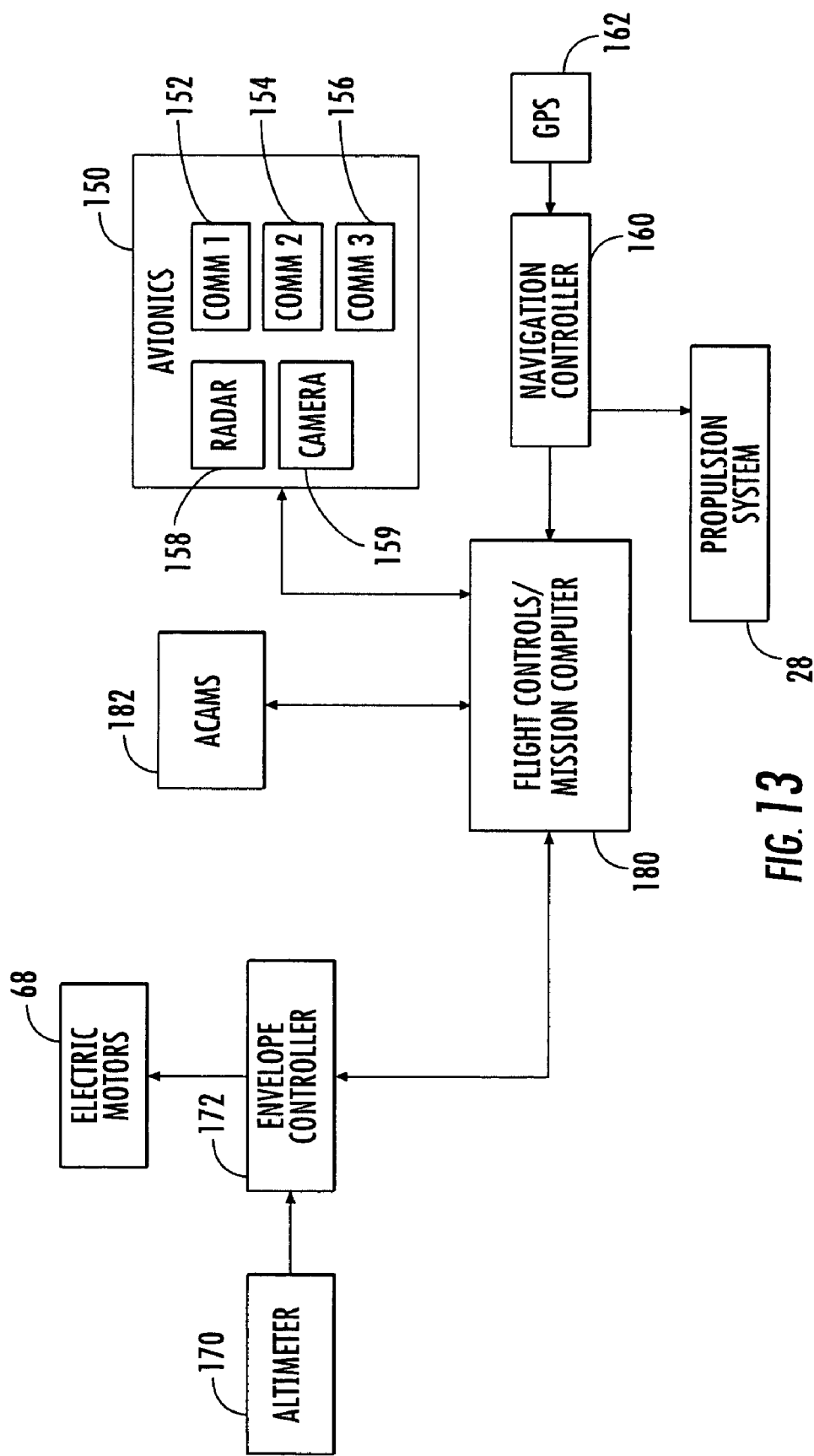
FIG. 13 is a block diagram illustrating the on-board electronics carried by the lighter-than-air aircraft in accordance with the present invention.

The altimeter 72 and the controller 74, as well as other on-board electronics and sensors, will be discussed in greater detail when reference is made to FIG. 13. The envelope controller 74 operates the small electric motors 68 so that the tension cords or tie-downs 70, 71 are either retracted or released based upon the altitude. This feature of the present invention advantageously allows for the expansion of the buoyant gas as the lighter-than-air aircraft 20 traverses the atmosphere to the desired station keeping altitude.

The desired altitude of the lighter-than-air aircraft 20 is preferably in the stratosphere, which corresponds to an altitude of 60,000 feet or higher. Of course, the lighter-than-air aircraft 20 may operate at lower altitudes depending on its intended purpose.

When the lighter-than-air aircraft 20 is in the lower atmosphere, the upper portion of the gas envelope 24 is retracted toward the control member 66, and the gondola 30 is also retracted toward the control member as illustrated in FIG. 6. This reduces the cross-sectional area of the gas envelope 24, which results in a low profile, i.e., a reduced drag. The winds in the denser air of the lower atmosphere have a significant effect on large structures, such as the lighter-than-air aircraft 20.

When the gas envelope 22 is fully collapsed, the height $h_1$ of the illustrated gas envelope is 80 feet, and the height $h_2$ including the gondola 30 is 97 feet. When the gas envelope 22 is fully expanded, as illustrated in FIG. 7, these dimensions $h_1$, $h_2$ are respectively 96 feet, 148 feet. The width $w_1$ of the gondola 30 is 22 feet, and the overall width $w_2$ of the lighter-than-air aircraft 20 is 215 feet. The height $h_3$ of the hoop-truss member 60 is 24 feet, and the height $h_4$ between the hoop-truss member and the top of the gas envelope 22 is 91 feet. The radius $r_1$ of the upper portion of the gas envelope 22 when fully expanded is 118 feet, whereas the radius $r_2$ of the lower portion of the gas envelope is 272 feet. The inside diameter of the hoop-truss member 60 is 161 feet. These numbers are for illustrative purposes only, and the actual size of the lighter-than-air aircraft will vary depending on the intended application.

Figure 8A:
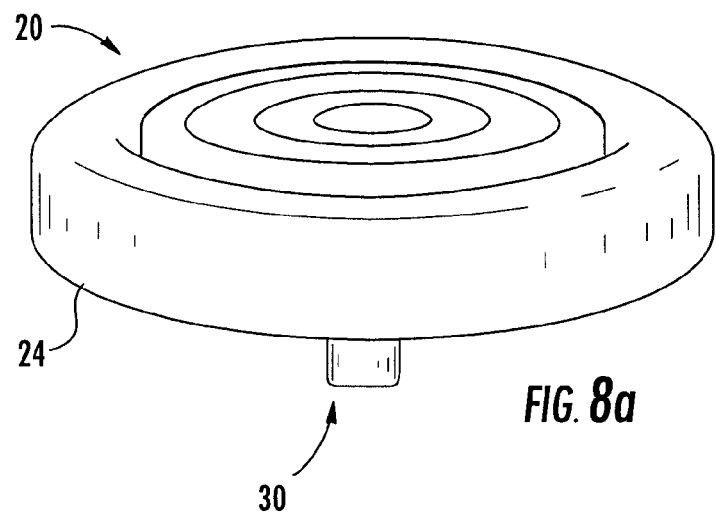
FIGS. 8a-8c are perspective views of the gas envelope changing from a retracted position to an expanded position as the altitude of the lighter-than-air aircraft increases in accordance with the present invention.
Figure 8B:
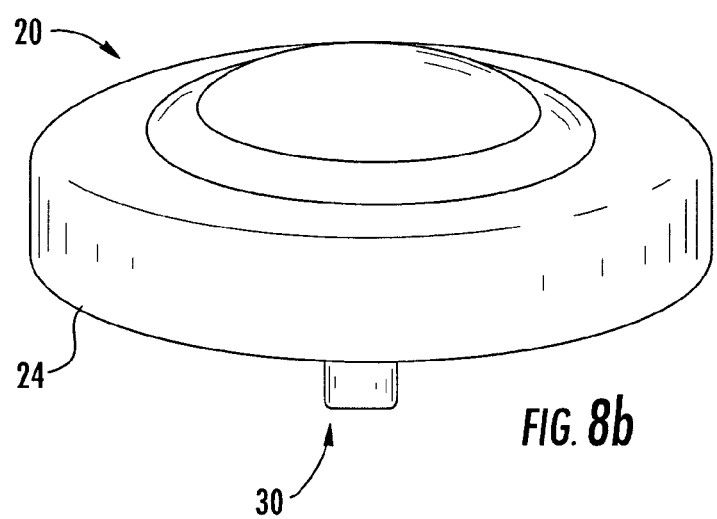
Figure 8C:
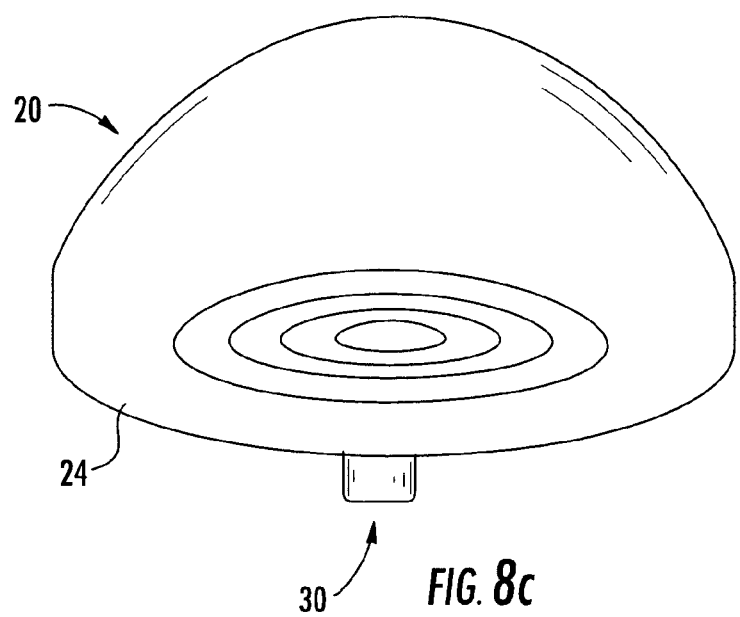

FIGS. 8a-8c are perspective views of the gas envelope 22 changing from the retracted position to the expanded position as the altitude of the lighter-than-air aircraft 20 increases. In the retracted position, the gas envelope 22 has a low drag because of its "flat top" and because the gondola 30 is pulled or held closer position toward the gas envelope, as shown in FIG. 8a. Because of the reduced cross section, this helps to reduce the effects of winds at the lower altitudes. As the lighter-than-air aircraft 20 increases in altitude, the buoyant gas expands so that the volume of the gas envelope 22 increases and the gondola 30 is lowered away from the gas envelope, as shown in FIG. 8b. Once the lighter-than-aircraft 20 reaches its desired altitude near or above 60,000 feet, the gas envelope 22 is fully expanded and the gondola 30 is in its resting position, as shown in FIG. 8c.

Another advantage of the "flat top" design is that it allows for a significant reduction in the height of the facility constructing the lighter-than-air aircraft 20. The lighter-than-air aircraft 20 may be constructed at the reduced height, and then moved outside for deployment.

The flexible material covering the hoop-truss member 60 and the control member 66 is preferably a high strength material. This material may be made from Kapton films, Tedlar, and Vectran, for example. The material may also comprise a polyester film, and may also be a combination of different materials. For example, Vectran may be used for the load bearing fabric. Tedlar and polyester film laminates may form the ultraviolet protection layer, and also function as a gas barrier. These materials have a high resistance to radiation and to cold temperatures.

An advantage of the present invention is that the gas envelope 22 may be constantly pointed in the direction of the sun. The gas envelope 22 is substantially symmetrical about its vertical axis and comprises an upper portion having a partial spheroidal shape. This shape advantageously provides for good solar incidence 360 degrees around the perimeter of the gas envelope 22, and at low elevation angles.

The solar panel 24 is carried by a predetermined angular segment of the partial spheroid. Out of a total angular segment of 360 degrees, the predetermined angular segment is within a range of about 60 to 120 degrees, for example, with about 90 degrees being illustrated in the figures. In contrast, the direct front or rear of a blimp has little or no solar exposure due to its lack of symmetry about a vertical axis. As a result of the spheroidal shape of the gas envelope 22, the solar panel 24 may be placed on any side thereof and still be optimized for collecting solar energy via the solar panel facing the direction of the sun. Since the effectiveness of the solar panel 24 is directly related to the incidence angle of the sunlight, it becomes very important to optimize these pointing angles.

Figure 9:
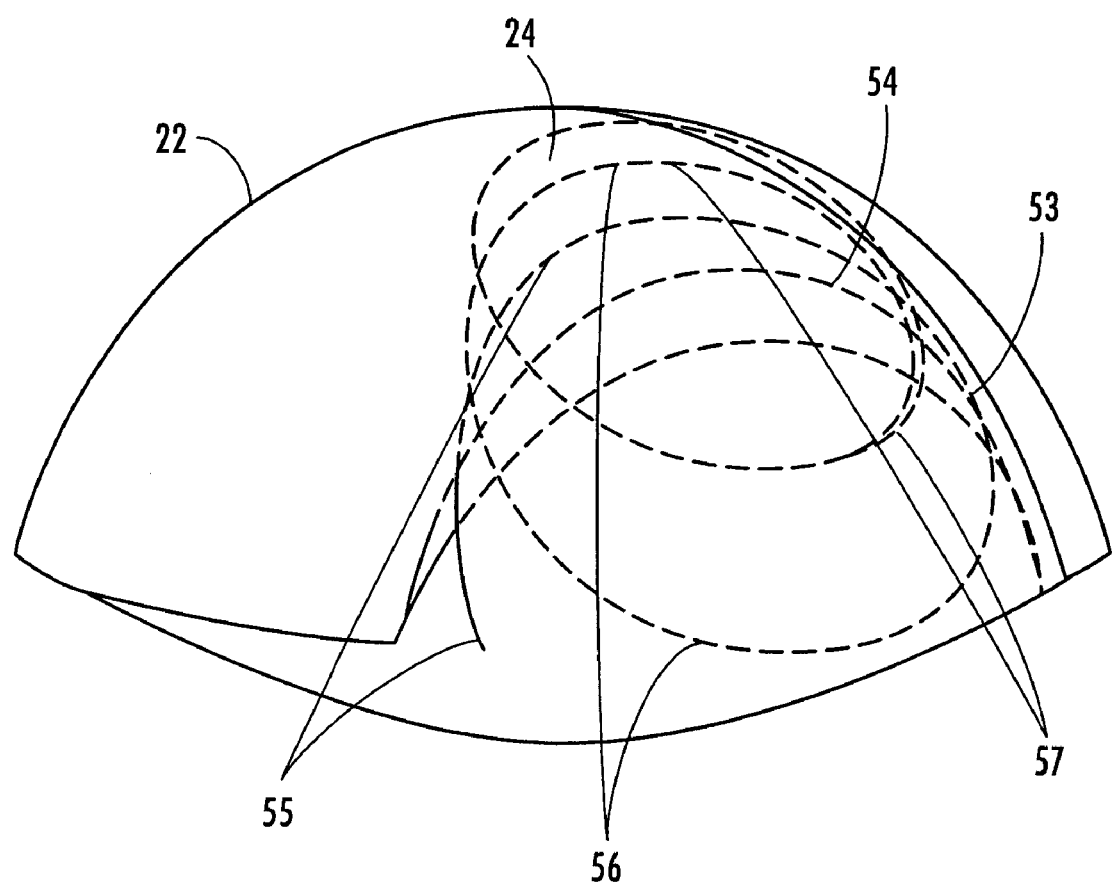
FIG. 9 is a perspective view of the gas envelope illustrating various angles of solar incidence for the solar panel in accordance with the present invention.

Various example positions of the sun above the horizon and its footprint on the solar panel 24 are shown in FIG. 9. For example, reference 53 represents the sun 0° above the horizon with a +/−40° view angle, reference 54 represents the sun 14° above the horizon with a +/−40° view angle, reference 55 represents the sun 28° above the horizon with a +/−35° view angle, reference 56 represents the sun 42° above the horizon with a +/−30° view angle, and reference 57 represents the sun 56° above the horizon with a +/−25° view angle. In addition, the solar panel 24 is plumbed back to the gondola 30 using reinforced channels within the solar surface and routing through portions of the inner support structure. The solar panel 24 thus has an efficient overall incident area when directed toward the sun. As a result of the additional weight of the solar panel 24 on one side of the gas envelope 22, the gondola 30 should be slightly off center or internal elements should be adjusted to balance the center of gravity.

As an alternative embodiment resulting from the gas envelope 22 being symmetrical about its vertical axis, solar panels 24 may be placed all the way around so that it does not matter which direction the gas envelope is pointing. Consequently, the use of the solar sensor 26 is no longer necessary. This embodiment may be particularly attractive if the technology for solar panels allows for light weight solar panels, and the impact of placing them all the way around the gas envelope 22 is not too detrimental to the overall weight and performance of the lighter-than-air aircraft 20.

Figure 10:
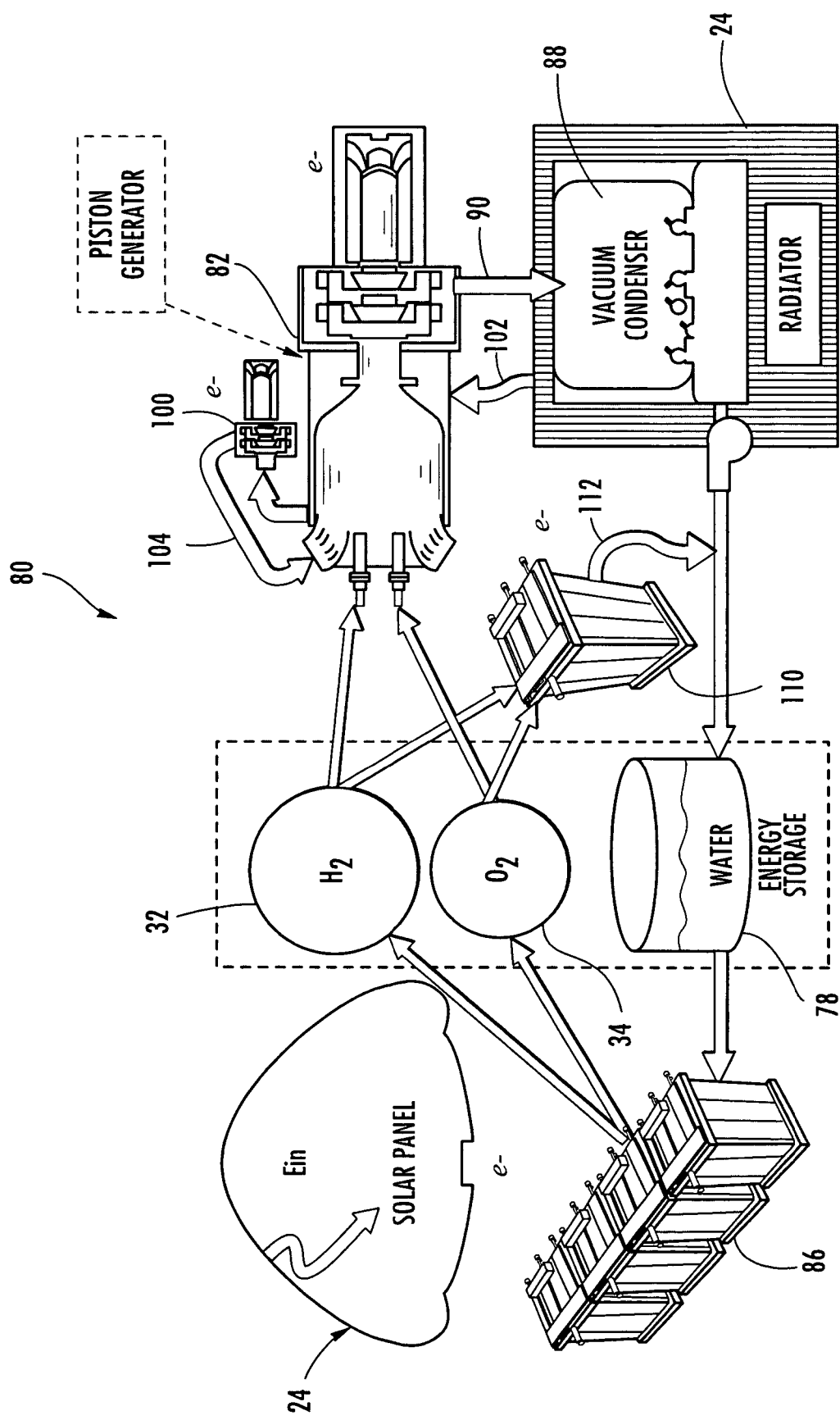
FIG. 10 is a block diagram of a closed loop combustion generator for generating electricity for the lighter-than-air aircraft in accordance with the present invention.
Figure 11:
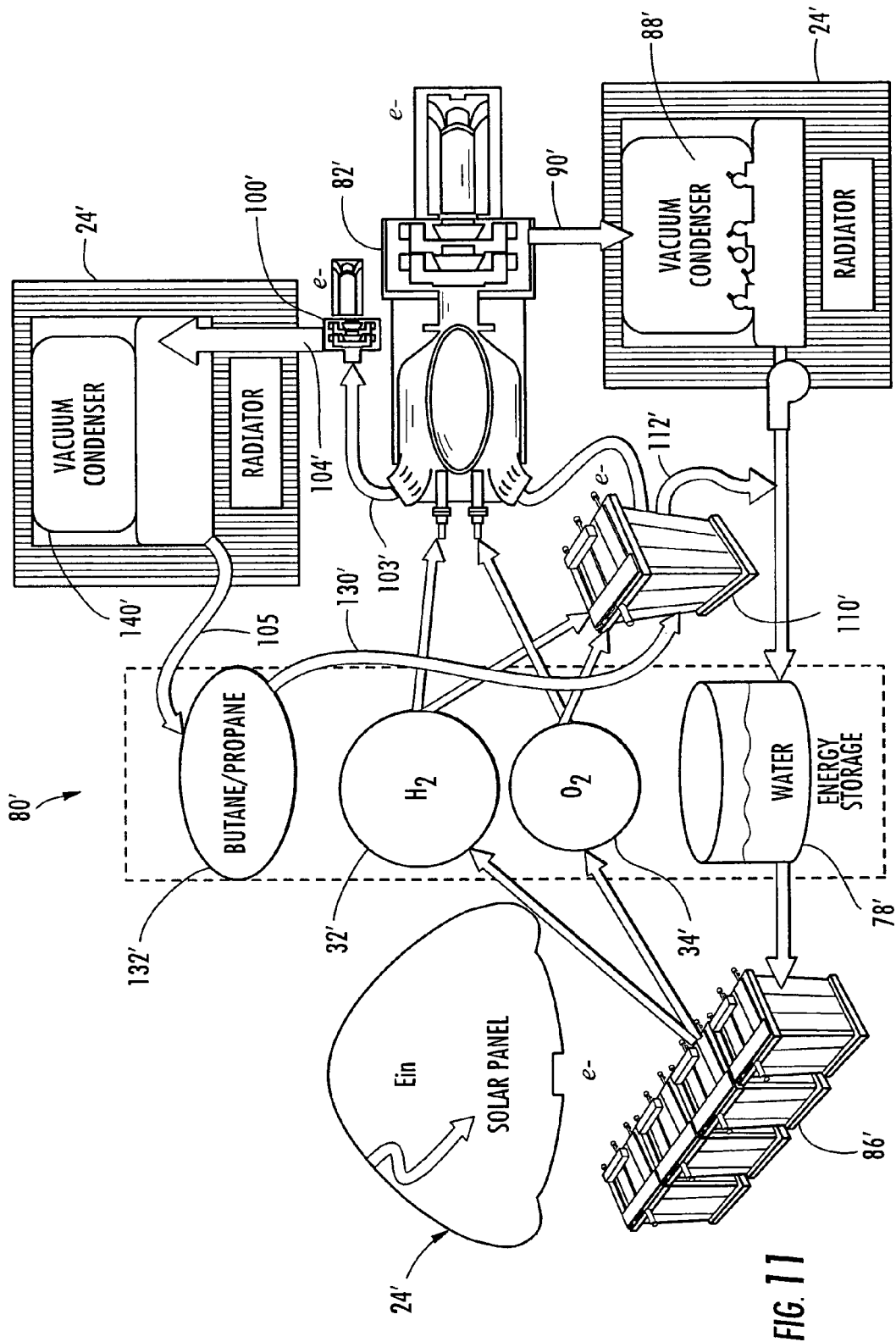
FIG. 11 is a block diagram of another embodiment of the closed loop combustion generator as shown in FIG. 11.
Figure 12:
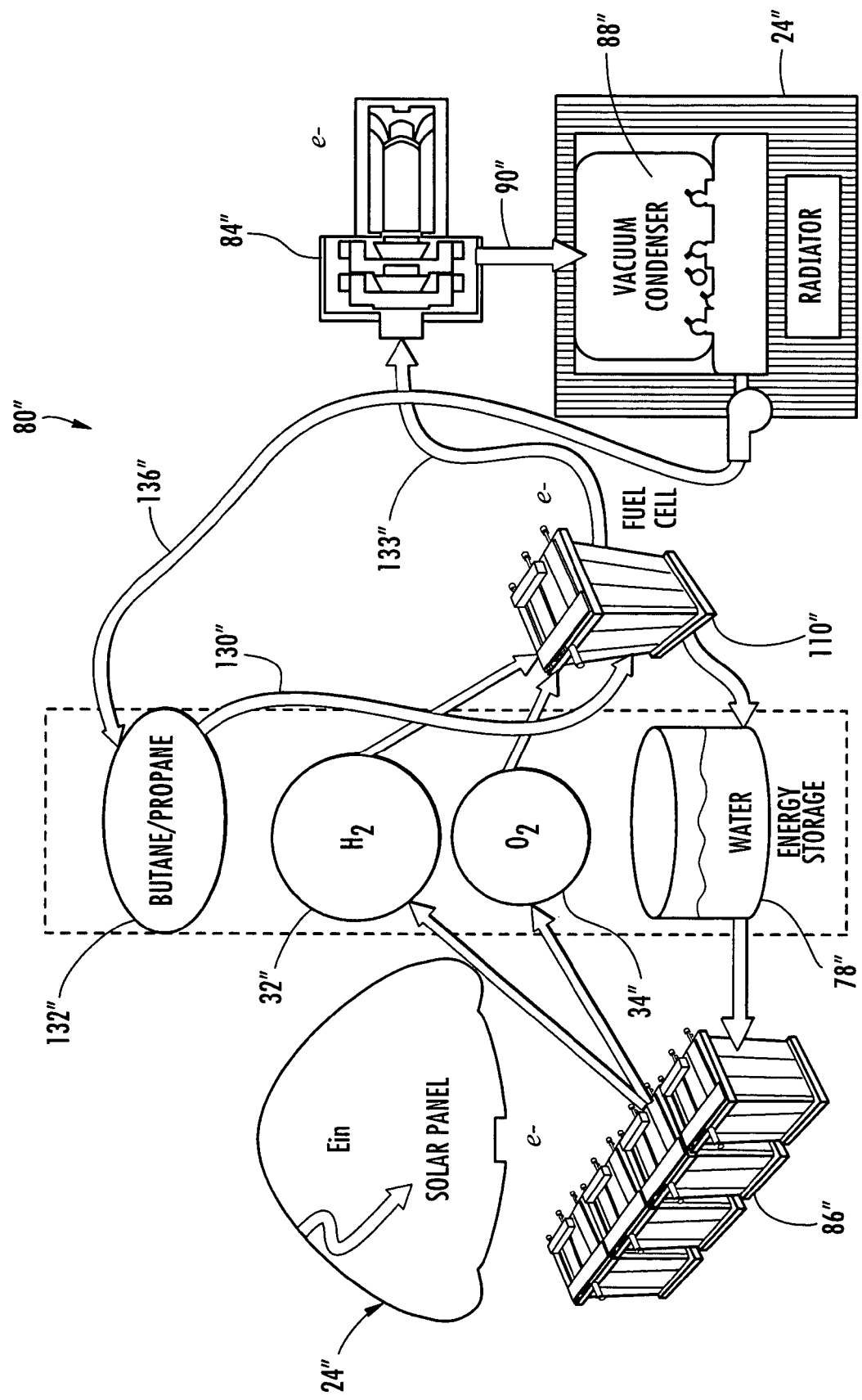
FIG. 12 is a block diagram of a closed loop fuel cell for generating electricity for the lighter-than-air aircraft in accordance with the present invention.

Referring now to FIGS. 10-12, various embodiments for generating electricity for the lighter-than-air aircraft 20 during the night cycle will now be discussed. It is worth noting that these different embodiments for generating electricity may also be used on other types of aircraft, including those that are heavier-than-air, as readily appreciated by those skilled in the art.

The sun is generally available for about 8 hours during the day in which extra electricity is generated beyond what is required for powering the lighter-than-air aircraft 20. Availability of the sun is highly dependent on location of the lighter-than-air aircraft 20 relative to the equator and on the time of the year. This extra electricity is used for regenerating fuel, which is then used for generating electricity during the night cycle. There are an additional 1.5 hours in the morning and 1.5 hours in the evening where the sun provides enough solar energy for powering the lighter-than-air aircraft 20, but does not generate any extra electricity. The night cycle is about 13 hours where there is effectively no sunlight available.

In the illustrated embodiment of the lighter-than-air aircraft 20, it is estimated that about 750 W-hr/kg is required. However, current battery technology offers about 150 W-hr/kg storage potential. Consequently, these batteries are not efficient enough, per unit of weight, for them to be a good choice for powering the lighter-than-air aircraft 20 during the night.

In one embodiment, a closed loop combustion generating system 80 powers the propulsion system 28 when the solar panel 24 is not generating sufficient electricity (i.e., during the night), and has its fuel regenerated by the solar panel from its exhaust when the solar panel is generating sufficient electricity (i.e., during the day). The closed loop combustion generating system 80 comprises a combustion generator 82 for receiving the fuel, and for generating a pressurized gas based upon combustion of the fuel. The combustion generator 82 may comprise a turbine generator or a piston generator, for example, for generating electricity and producing exhaust 90 as a result thereof.

The closed loop combustion generating system 80 comprises a condenser 88 for condensing the exhaust 90 from the combustion generator 82 to a liquid. The condenser 88 takes advantage of the cold ambient night to remove heat from the exhaust. In the illustrated embodiment, the condenser 88 is carried by the gas envelope 22 adjacent the solar panel 24. The condenser 88 is spread out adjacent the solar panel 24, which acts as a radiator for removing heat, i.e., a large heat sink potential. With the ambient air being about −70° F. at 60,000 feet, and the heat sink potential being about 18 W/ft$^2$, the solar panel 24 can effectively function as a radiator. In another embodiment, the condenser 88 is carried by the gondola 30, and air may be forced over the condenser to help condense the exhaust 90 to a liquid.

At least one converter 86 converts the liquid from the condenser 88 back into fuel when electricity is being input from the solar cell 24, i.e., during the day. The fuel comprises hydrogen gas and oxygen gas so that the exhaust comprises water. The converter 86 comprises an electrolyzer for breaking the water down during the day into the hydrogen and oxygen gases, which are stored in respective fuel storage holders 32, 34. This fuel is then used during the night cycle for generating electricity. The water is stored in a water storage holder 78 in the gondola 30. Insulation and mini-heaters are used to keep the water from freezing at the high operating altitudes of the lighter-than-air aircraft 20.

If the water ever needs to be replenished while the lighter-than-air aircraft 20 is in flight, the aircraft may drop its altitude so that it is in the clouds. Once the lighter-than-air aircraft 20 is in the clouds, water may be collected, as readily appreciated by those skilled in the art. Along these same lines, if the buoyant gas in the gas envelope 22 needs to be replenished, then a portion of the hydrogen gas in the hydrogen gas storage holder 32 may be added to the gas envelope.

A fuel cell 110 may also be used for combining the hydrogen and oxygen gases for generating electricity. A by-product 112 of combining the hydrogen and oxygen gases in the fuel cell 110 is water 112, which is routed to the water storage holder 78.

The closed loop combustion generating system 80 may also includes a second generator 100 for generating electricity. A portion of the water 102 from the condenser 88 or a portion of the water 112 from the fuel cell 110 may be routed to the combustion generator 82. The combustion generator 82 can reach temperatures of about 5800° F., and the heat generated by the combustion chamber is used to heat the water.

Once the water is heated to a pressurized gas, it is applied to the second generator 100. The pressurized gas may drive a turbine, as illustrated, or a piston, for example, for generating electricity. The exhaust 104 exiting the second generator 100 is then combined with the hydrogen and oxygen gases within the combustion generator 82. Effectively, this is a reheat stage that includes the addition of the new combustion gas products.

In another embodiment, the closed loop combustion generator 80' is based upon the use of a vaporization fluid such as butane or propane for generating electricity, as shown in FIG. 11. The elements having the same reference numerals as in FIG. 10 perform the same function and will not be discussed.

Liquid butane or propane 130' is first routed from a supplemental fuel holder 132' to the fuel cell 110'. The fuel cell 110' is about 50% efficient, which means the heat generated by the fuel cell when generating electricity may be used for heating the butane or propane. The butane or propane will also be referred to as a supplemental liquid 130'.

In lieu of propane or butane, another liquid or gas having similar properties may be used as the supplemental liquid. These properties include low vapor pressure at temperatures between −30° F. and −70° F., and a much higher vapor pressure at temperatures between 110° F. and 180° F. For example, the supplemental liquid has gas properties of 0 psig vapor pressure at −60° F. (in the condenser 140'), and between 150-200 psig at 110° F. (at the fuel cell 110'). Propane or butane, for example, condenses to a liquid at about −60° F., which is the same temperature as the ambient atmosphere at 60,000 feet. Thermal removal rate is about 18 W/ft$^2$.

The heat generated by the fuel cell 110' is used to pre-heat the supplemental liquid 130'. When the supplemental liquid 130' is heated, it vaporizes at a much lower temperature. As it heats, the liquid butane or propane turns into a gas. The goal is to convert from liquid to vapor within the fuel cell 110' which maximizes the effective heat transfer associated with the latent heat of vaporization. The gas is routed to the combustion generator 82'. As the gas is heated even higher, it becomes more unstable and becomes a pressurized gas which increases the volume that is maintained near constant pressure.

The pressurized gas 103' is used to drive a second generator 100' for generating electricity. The exhaust 104' from the second generator 100' is routed to a second condenser 140'. The condensed supplemental exhaust 105' is routed to the supplemental liquid holder 132'. In the illustrated embodiment, the second condenser 140' is also carried by the gas envelope 22' adjacent the solar panel 24'. In another embodiment, the second condenser 140' is carried by the gondola 30', and air may be forced over the condenser to help condense the gas to liquid form. The exhaust 104' will be in the form of an expanded gas. The ambient temperature will cool the gas back to the supplemental liquid 130' (a point of re-liquefaction/condensing). This process for the supplemental liquid 130' does not occur naturally at or near the earth's surface, for instance, below 20,000 feet altitude.

In yet another embodiment of generating electricity during the night, a closed loop fuel cell 80" is used, and the supplemental liquid 130" is heated by the fuel cell 110". The supplemental liquid 130" is heated until it becomes a pressurized gas 133". The pressurized gas 133" is used to drive a generator 84" for generating electricity. The generator 84" is a turbine generator or a piston generator, for example.

The exhaust 90" from the generator 84" is routed to a condenser 88". The condensed supplemental exhaust 136" is then routed to the supplemental liquid holder 132". As in the previous embodiments, the condenser 88" is also carried by the gas envelope 22" adjacent the solar panel 24" so that it operates as a heat sink during the night. In another embodiment, the condenser 88" is carried by the gondola 30", and air may be forced over the condenser to help condense the gas to liquid form.

Another advantage of this particular embodiment is that the system can be reversed during the day for generating electricity. That is, the supplemental liquid is heated by the solar panel 24 so that it becomes a pressurized gas for driving a generator for generating electricity, as readily appreciated by those skilled in the art. Further, the supplemental liquid is re-condensed in the gondola 30 by ambient air forced over a heat exchanger, as readily appreciated by those skilled in the art.

The on-board electronics carried by the lighter-than-air aircraft 20 will now be discussed with reference to FIG. 13. The avionics 150 required to support the lighter-than-air aircraft includes a number of different type communications links. A first communications link 152 is a two-way, line-of-sight system capable of uploading commands for controlling the aircraft's 20 systems and payloads, and downloading the status of all on-board systems and mission payload data. This communications link may operate at the Ku-band and is capable of providing uplink rates of at least 200 kbps and downlink rates from 2 Mbps to 274 Mbps.

A second communications link 154 includes one or more satellite communication systems to be used for both vehicle and payload control and monitoring as well as transmission of payload data. A third communications link 156 includes VHF/UHF radios for providing a direct communications path to air traffic controllers. It also allows a remotely located "pilot" to communicate with a controller, thus providing a standard interface to the world. The avionics 150 also includes a radar 158 and a camera 159.

The navigation controller 160 cooperates with the propulsion system 28 to move the lighter-than-air aircraft 20 along a desired flight path while the solar panel 24 is oriented in the direction of the sun. The navigation controller 160 receives information on the location of the lighter-than-air aircraft 20 from a GPS receiver 162. An altimeter 170 provides altitude information to an envelope controller 172 for controlling the profile of the gas envelope 22 based upon the altitude. As discussed above, the gas envelope 22 may be in a retracted position at low altitudes, but as the altitude increases and the buoyant gas expands within the gas envelope, then the envelope controller 172 places the gas envelope in the expanded position.

Flight controls/mission computer 180 interfaces with the other electronic devices on-board for providing overall control of the lighter-than-air aircraft 20. An aircraft condition analysis and management system (ACAMS) 182 is also carried by the lighter-than-air aircraft 20 for providing aircraft diagnostics.

Many modifications and other embodiments of the invention will come to the mind of one skilled in the art having the benefit of the teachings presented in the foregoing descriptions and the associated drawings. In addition, other features relating to the lighter-than-air aircraft is disclosed in the copending patent application filed concurrently herewith and assigned to the assignee of the present invention and is entitled LIGHTER-THAN-AIR AIRCRAFT INCLUDING A CLOSED LOOP COMBUSTION GENERATING SYSTEM AND RELATED METHODS FOR POWERING THE SAME, Application Ser. No. 10/977,791, the entire the entire disclosure of which is incorporated herein in its entirety by reference. Therefore, it is understood that the invention is not to be limited to the specific embodiments disclosed, and that modifications and embodiments are intended to be included within the scope of the appended claims.

That which is claimed is:

1. A lighter-than-air aircraft comprising:
a gas envelope for containing a buoyant gas;
a support structure within said gas envelope for moving said gas envelope from a retracted position to an expanded position, said support structure comprising
a hoop-truss member,
a control member positioned above and coupled to said hoop-truss member, and
a first plurality of tie-downs between said control member and a portion of said gas envelope positioned above said control member, with a length of said first plurality of tie-downs being increased as said gas envelope moves from the retracted position to the expanded position;
at least one solar panel carried by a predetermined portion of said gas envelope;
at least one solar sensor for determining a direction of the sun; and
a propulsion system carried by said gas envelope for orienting said gas envelope so that said at least one solar panel is oriented in the direction of the sun based upon said at least one solar sensor to thereby increase solar energy collection efficiency.

2. A lighter-than-air aircraft according to claim 1 further comprising a navigation controller cooperating with said propulsion system to move the lighter-than-air aircraft along a desired flight path while said at least one solar panel is oriented in the direction of the sun.

3. A lighter-than-air aircraft according to claim 1 wherein said gas envelope is substantially symmetrical about a vertical axis and comprises an upper portion having a partial spheroidal shape; and wherein said at least one solar panel is carried by a predetermined segment of said partial spheroid.

4. A lighter-than-air aircraft according to claim 1 wherein said propulsion system comprises an electrical propulsion system; and further comprising at least one closed loop fuel cell carried by said gas envelope for powering said electrical propulsion system when said at least one solar panel is not generating sufficient electricity, and having its fuel regenerated by said at least one solar panel from its exhaust when said at least one solar panel is generating sufficient electricity.

5. A lighter-than-air aircraft according to claim 1 further comprising a gondola carried by said gas envelope; and wherein said support structure further comprises a second plurality of tie downs between said control member and said gondola, with a length of said second plurality of tie-downs being increased as said gas envelope moves from the retracted position to the expanded position.

6. A lighter-than-air aircraft according to claim 5 further comprising:
at least one electric motor controlling the length of said first and second plurality of tiedowns; and
an envelope controller connected to said at least one electric motor for control thereof based upon an altitude of the lighter-than-air aircraft.

7. A lighter-than-air aircraft according to claim 1 further comprising a gondola carried by said gas envelope; and wherein said propulsion system comprises:
- a plurality of spaced apart propellers extending outwardly from said gondola; and
- a respective electric motor for driving each of said propellers.

8. A lighter-than-air aircraft according to claim 7 wherein said propulsion system further comprises a respective gimbal coupled to each of said propellers.

9. A lighter-than-air aircraft according to claim 1 wherein the lighter-than-air aircraft is unmanned.

10. A lighter-than-air aircraft comprising:
- a gas envelope for containing a buoyant gas and being symmetrical about a vertical axis;
  - a support structure within said gas envelope for moving said gas envelope from a retracted position to an expanded position, said support structure comprising a hoop-truss member,
    - a control member positioned above and coupled to said hoop-truss member, and
    - a first plurality of tie-downs between said control member and a portion of said gas envelope positioned above said control member, with a length of said first plurality of tie-downs being increased as said gas envelope moves from the retracted position to the expanded position;
- at least one solar panel carried by a predetermined portion of said gas envelope;
- at least one solar sensor for determining a direction of the sun; and
- a propulsion system carried by said gas envelope for orienting said gas envelope so that said at least one solar panel is oriented in the direction of the sun based upon said at least one solar sensor to thereby increase solar energy collection efficiency.

11. A lighter-than-air aircraft according to claim 10 further comprising a navigation controller cooperating with said propulsion system to move the lighter-than-air aircraft along a desired flight path while said at least one solar panel is oriented in the direction of the sun.

12. A lighter-than-air aircraft according to claim 10 wherein said gas envelope comprises an upper portion having a partial spheroidal shape; and wherein said at least one solar panel is carried by a predetermined angular segment of said partial spheroid.

13. A lighter-than-air aircraft according to claim 10 wherein said propulsion system comprises an electrical propulsion system; and further comprising at least one closed loop fuel cell carried by said support structure for powering said electrical propulsion system when said at least one solar panel is not generating sufficient electricity, and having its fuel regenerated by said at least one solar panel from its exhaust when said at least one solar panel is generating sufficient electricity.

14. A lighter-than-air aircraft according to claim 10 further comprising a gondola carried by said gas envelope; and wherein said support structure further comprises a second plurality of tie downs between said control member and said gondola, with a length of said second plurality of tie-downs being increased as said gas envelope moves from the retracted position to the expanded position.

15. A lighter-than-air aircraft according to claim 14 further comprising:
- at least one electric motor controlling the length of said first and second plurality of tie-downs; and
- an envelope controller connected to said at least one electric motor for control thereof based upon the altitude of the lighter-than-air aircraft.

16. A lighter-than-air aircraft according to claim 10 further comprising a gondola carried by gas envelope; and wherein said propulsion system comprises:
- a plurality of spaced apart propellers extending outwardly from said gondola; and
- a respective electric motor for driving each of said propellers.

17. A lighter-than-air aircraft according to claim 16 wherein said propulsion system further comprises a respective gimbal coupled to each of said propellers.

* * * * *